Nov. 21, 1933.  A. BLATZ, JR  1,935,870
MILKING MACHINE
Filed Feb. 13, 1929  3 Sheets-Sheet 1
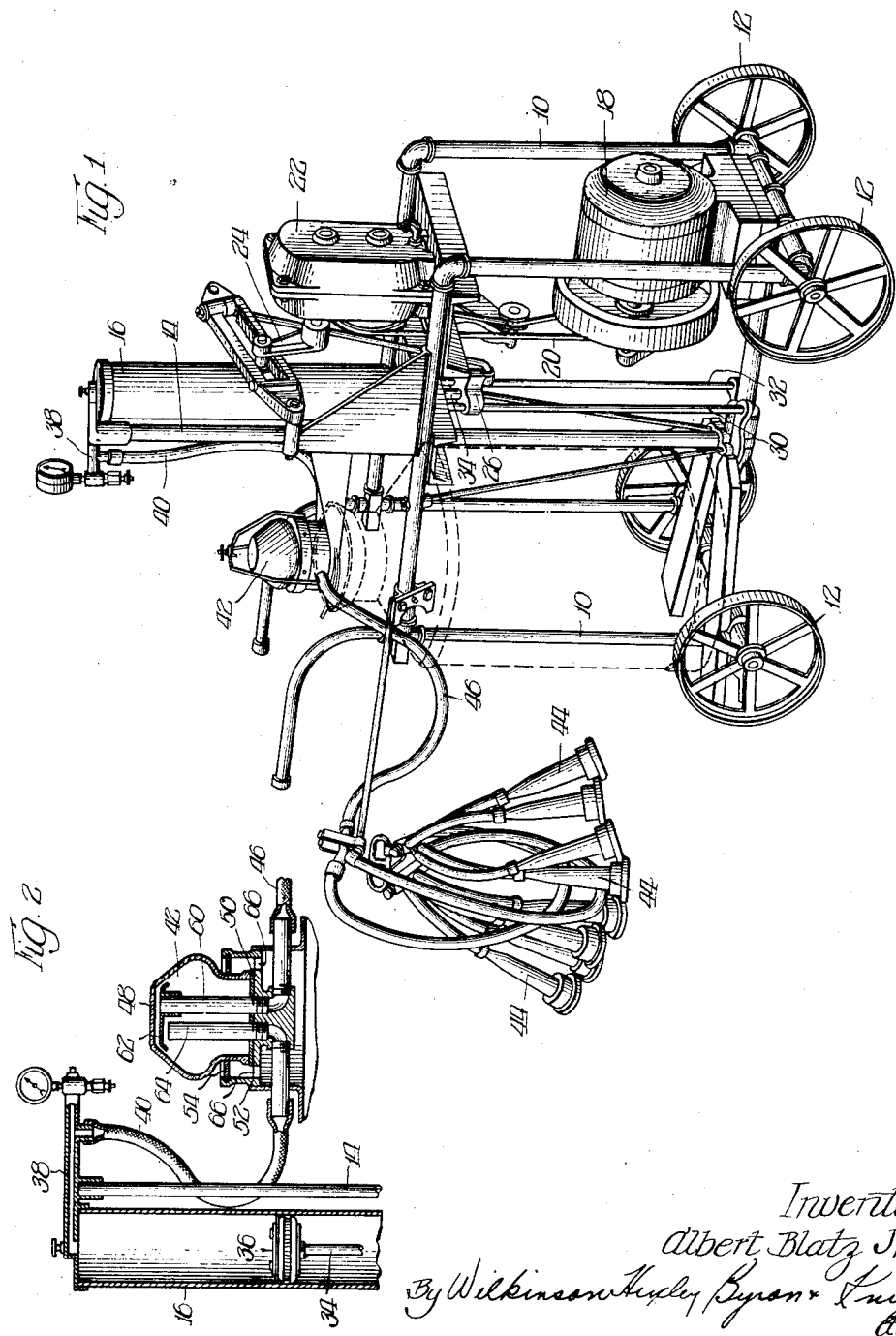
Inventor:
Albert Blatz Jr.,
By Wilkinson Huxley Byron & Knight
Attys.

Nov. 21, 1933.   A. BLATZ, JR   1,935,870
MILKING MACHINE
Filed Feb. 13, 1929   3 Sheets-Sheet 2
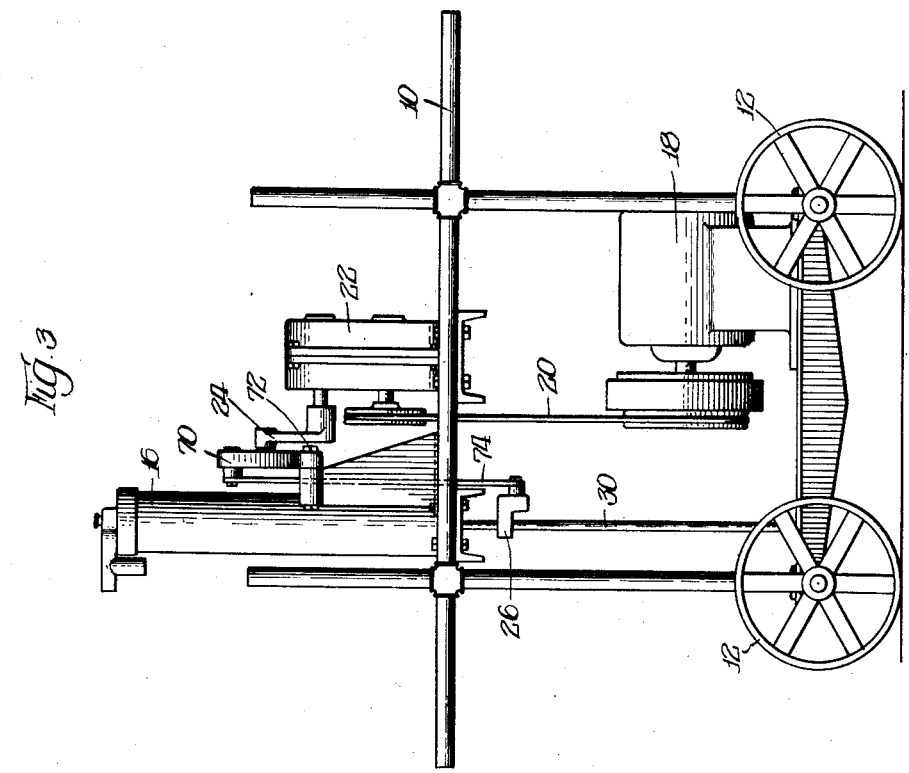
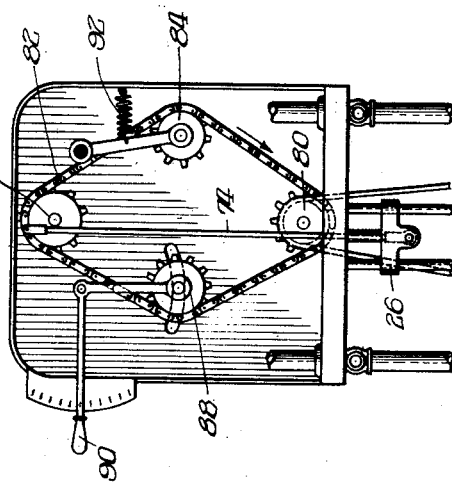
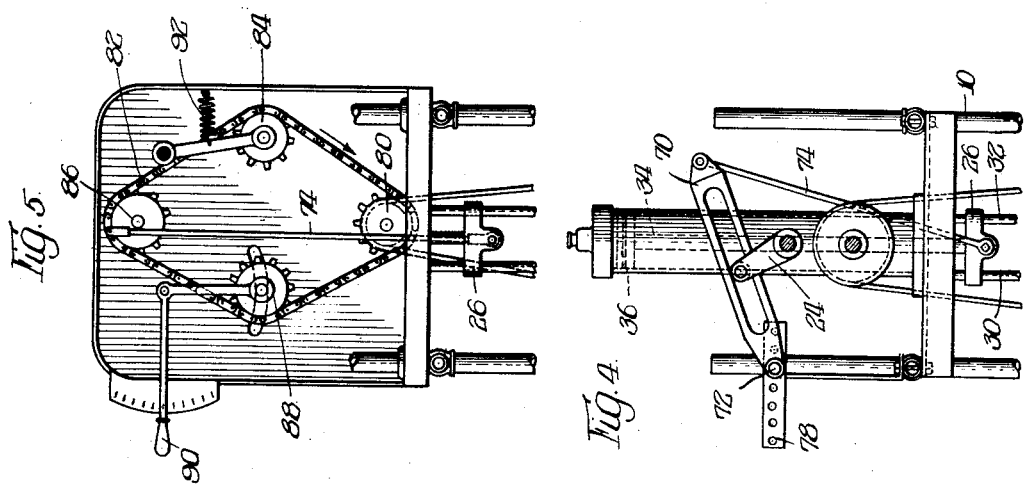
Inventor:
Albert Blatz Jr.,
By Wilkinson Huxley Byron Knight
Attys.

Nov. 21, 1933.      A. BLATZ, JR      1,935,870
MILKING MACHINE
Filed Feb. 13, 1929      3 Sheets-Sheet 3

Suction
Discharge

Suction
Discharge

Suction
Discharge

Suction
Discharge

Suction
Discharge

Suction
Discharge

Inventor:
Albert Blatz Jr.,
By Wilkinson Huxley Byron & Knight
attys.

Patented Nov. 21, 1933

1,935,870

UNITED STATES PATENT OFFICE 1,935,870

MILKING MACHINE

Albert Blatz, Jr., Milwaukee, Wis., assignor, by mesne assignments, to Pioneer Manufacturing Co.

Application February 13, 1929. Serial No. 339,606

1 Claim. (Cl. 31—73)

This invention relates to milking machines and is illustrated herein as embodied in a machine of the same general character and construction as those disclosed in United States Letters Patents Nos. 1,405,166, granted January 31, 1922, and 1,459,420, granted June 19, 1923, both of which are assigned to the assignee of the present invention.

In milking machines of the type here under discussion, it is customary to provide a milk receiving chamber or container and to position it above an ordinary milk can. A plurality of teat cups are provided for attachment to the udder of a cow and communicate with a common conduit which leads to the milk receiving chamber. By means of a pump mechanism, a partial vacuum is periodically built up in the milk receiving chamber thereby causing milk to be drawn through the teat cups, and the common conduit, and discharged into the chamber. The foregoing action takes place during the suction stroke of the pump and on the following compression stroke air under pressure flows into the milk receiving chamber, lifts a valve, and permits the accumulation of milk in the chamber to flow by gravity into the can.

In milking machines heretofore in use the duration and magnitude of the suction stroke of the pump have been exactly the same as the duration and magnitude of the compression stroke with the result that the partial vacuum which is periodically set up in the milk receiving chamber lasts during a period of time exactly equal to that during which the vacuum is destroyed and air pressure is set up to cause discharge of the milk from the chamber. Although such milking machines have proved eminently satisfactory and are employed extensively throughout the country today such machines are, like all others, occasionally subject to improvement and it is with a view to increasing the efficiency and to perfecting the operation of milking machines of the type now in use that the present invention is provided.

It will be appreciated, of course, that during the operation of milking a cow mechanically only a certain amount of suction can be applied without causing undue disturbance of the animal, and hence, in searching for a way in which to increase the normal efficiency of a milking machine, it is not advisable to endeavor to increase the suction side of the operation. On the other hand, the applicant has found that the efficiency may be increased by speeding up the discharge side of the operation, and in the provision of means for accomplishing this purpose resides an extremely important feature of the present invention.

During the suction stroke the milk flows at a moderately slow rate through the common conduit into the milk containing chamber. Subsequently, the valve of the chamber is open to permit the escape of the milk and by providing a valve of sufficient size the escape of the milk from the container may be effected much more rapidly than the admission of milk to the container. It will, therefore, be seen that by increasing the size of the valve and shortening the length of time that it is kept open the operation of the milking machine may be speeded up without interfering in the least with the proper operation thereof.

It is to be recognized, of course, that in some machines the valve mechanism for permitting the escape of milk from the chamber will already be sufficiently large to cause a rapid emptying of the chamber, and hence it will not be necessary to increase the size of the valve, but merely to shorten the length of time it is kept open.

In view of the fact that the chamber is filled on the suction stroke of the pump and that the valve is lifted on the compression stroke of the pump, it being remembered that the suction stroke cannot be increased or speeded up, it will be realized that one way of carrying out the feature under discussion would be to shorten the duration of the compression stroke without altering the duration of the suction stroke, or, to gain a still greater advantage by increasing the duration of the suction stroke, as contrasted with decreasing it. By increasing the duration of the suction stroke and by decreasing the duration of the discharge stroke, a greater volume of milk will be drawn into the milk receiving chamber and will be discharged therefrom in less time than has been utilized heretofore.

Thus, since the present invention does so alter the strokes, the efficiency of the machine is materially increased by the invention inasmuch as there is an increase in the volume of milk delivered to the chamber on the suction stroke and a decrease in the time spent in discharging the milk from the chamber on the discharge stroke.

In addition to the important increase in efficiency of the milking machine the feature of the invention under discussion is conducive to the performance of a more natural and normal milking action than has heretofore been obtainable. This is true by reason of the fact that a comparatively long suction or discharge stroke is applied to the cow's udder and periodically the suction is destroyed to afford relatively short periods of rest for the animal; this resembling somewhat with the action that is followed in hand milking.

In the illustrated embodiment of the invention, there is interposed between the pump mechanism and the source of power for driving the pump a device for producing a relatively slow suction stroke of comparatively long duration and a comparatively fast compression stroke of relatively long duration. A suitable mechanism for performing this operation is to be found in what is commonly known in other arts as the Whitworth quick return mechanism, through the use of which the piston in the pump may move slowly forward in its suction stroke and return quickly during the discharge stroke. Other mechanisms, however, are equally suitable to the performance of this task and the applicant has gone so far as to disclose an entirely different mechanism which may be employed with equal facility.

Still another important feature of the invention must be found to reside in the provision of an improved method of mechanically milking a cow which consists in applying a suction of comparatively long duration to the udder of the cow to draw the milk therefrom and discharge it into a receptacle and periodically destroying the suction to relieve the cow and simultaneously discharging the milk from the receptacle.

Other objects and features of the invention will become apparent from a reading of the specification in the light of the accompanying drawings, in which—

Figure 1 is a view in perspective showing a milking machine having the present invention embodied therein;

Figure 2 is a fragmentary view of the machine shown in Figure 1 illustrating more particularly the construction and arrangement of the pumping mechanism;

Figure 3 is a view of a milking machine having means associated therewith for varying the length of the compression and suction strokes of a pump;

Figure 4 is a fragmentary view of the apparatus shown in Figure 3 illustrating more clearly the means for effecting the variation and stroke;

Figure 5 is a modified form of means for varying the strokes of the pump;

Figures 6, 7, 8, 9, 10, 11:
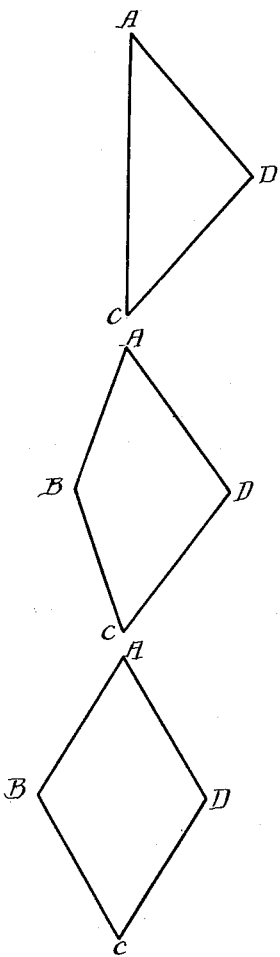

Figures 6, 7, and 8 are diagrammatic views illustrating the manner in which the mechanism shown in Figure 5 effects a variation in the stroke; and, Figures 9, 10, and 11 are additional diagrammatic views showing the manner in which the mechanism of Figure 4 may be employed to bring about a variation in stroke.

Turning to Figure 1, the milking machine is comprised generally of a frame work 10, mounted on wheels 12, and provided with a central upright supporting column 14 to which there is secured a pump cylinder casing 16. A motor 18 is carried by the base of the frame and by means of a belt 20 drives a reduction gear located within the casing 22. Motion imparted to the reduction gear is transmitted to a rotary crank 24 and thence by mechanism hereinafter to be explained to a cross head 26, which is mounted for vertical sliding movement on upright guides 30, 32. A piston rod 34 connects at its lower extremity with the cross head and at its upper extremity is joined to a piston 36 which is mounted for vertical reciprocation within the closed cylinder 16. The space above the piston 36 is provided with an outlet, herein shown in the form of a conduit 38, which connects with a flexible connector 40 leading to a milk container or chamber 42.

A plurality of teat cups 44 are provided for attachment to the udder of a cow and these cups communicate with a common passageway conduit 46 which also leads to the milk chamber or receptacle 42.

During the operation of the milking machine, a can (indicated in Figure 1 in dotted lines) is positioned beneath the milk chamber or container 42 and the motor is started whereupon the piston 36 reciprocates vertically within the cylinder 16, first to draw air out of the container 42 through the conduit 40, and thereafter out of the tea cups 44 through the connector 46 whereupon milk is drawn from the udder of the cow into the milk container 42.

At the completion of the downward or suction stroke of the piston the milk withdrawn during such stroke is entrapped within the milk chamber 42 and subsequently during the compression stroke air is admitted through the conduit 40 into the milk chamber causing a valve to open whereupon the entrapped milk escapes from the container and flows downwardly into the can, or other suitable receptacle, shown in dotted lines.

Turning to Figure 2, it will be seen that the milk chamber 42 comprises an inverted hollow glass bowl 48 having its lower edge seated on a suitable gasket 50. The bowl 48 is free to be raised and lowered and in order to seal the space between the outer wall 52 of the chamber and the bowl 48 there is provided a deformable gasket 54 which surrounds the bowl and closes said space.

More specifically, the operation is this: as the piston 36 starts downwardly on a suction stroke air is withdrawn from the tube 40, the bowl 48, the conduit 46, and eventually the teat cups 44 whereupon milk flows into the bowl 48 through an upwardly extending pipe 60 and is, by means of a shield 62, prevented from flowing downwardly through a second pipe 64 which communicates with the tube 40. Thus, the milk is entrapped within the bowl 48 at the conclusion of a suction stroke whereupon the the piston commences to ascend driving the air out through the tube 40 and into the bowl 48. As the air pressure collects within the bowl, it causes the latter to rise whereupon the entrapped milk flows downwardly past the lower edge of the bowl and through openings 66 into the can which is shown in dotted lines.

As hereinbefore stated, the applicant has found that a more efficient milking machine may be produced by increasing the period of duration of each suction stroke and decreasing the length of duration of the discharge stroke, or merely by increasing the former, or decreasing the latter. The reason for this is that the fluid runs out of the bowl 48 much quicker than it flows thereinto, so if the suction stroke is increased, the bowl may be filled with milk to the desired level, the bowl 48 made to rise for a comparatively short period of time although allowing complete escape of the fluid. The bowl quickly settles back down into place and again the long suction stroke takes place whereby an increase in efficiency is effected over those machines in which the same amount of time is expended in performing the discharge operation as is expended in performing the suction operation.

To the end of increasing the duration of the suction stroke and decreasing the duration of the discharge stroke, the milking machine may be provided, as illustrated in Figures 3 and 4, with what is generally known as a Whitworth quick return mechanism.

As shown in Figures 3 and 4, the Whitworth quick return mechanism comprises a slotted lever 70 pivoted to the frame of the machine at one extremity 72 and secured at the opposite extremity to a connecting rod 74 which joins the cross head 26. The crank arm 24 is provided with a roller or other suitable element for engaging within the surface of the slot to reciprocate the outer extremity 70 of the lever during rotation of the crank.

Turning now to Figures 9, 10, and 11, an effort will be made to explain somewhat summarily the operation of the Whitworth quick return mechanism. In Figure 9, the point 72 is represented by the reference character P and the radius of the circle A represents the length of the crank 24, the center of the crank being positioned at the center of the circle, and the circle itself represents the path of movement of the outer extremity of the crank. The tangents leading from the point P represent the slotted lever arm.

From an inspection of Figure 4, in conjunction with Figure 9, it will be understood that the arc through which the outer extremity of the crank moves in raising the connecting rod 74, during the compression stroke, is, owing to the proximity of the path of movement to the pivot point 72 of the slotted lever, shorter than the arc through which the outer extremity of the crank moves, and also the connecting rod 74, during the downward or suction stroke of the piston. Since the speed of rotation of the crank is always constant and inasmuch as it moves through a smaller distance in raising the piston than it does in lowering the same, it must be appreciated that the piston moves faster during its up stroke than during its down, and, to repeat, this is owing to the fact that the outer extremity of the crank is nearer the axis of pivot of the slotted arm during the raising of the piston than it is during the lowering thereof.

In Figure 9, this difference in time duration of the stroke as shown by means of the solid and dotted portions of the circle, the solid line representing the long suction stroke and the dotted line representing the comparatively short discharge stroke.

Furthermore, through the provision of an extension bracket 78 (Figure 4) the slotted arm may be adjusted to vary the distance between the crank 24 and the pivot point of the arm whereupon the variations in the suction and discharge strokes may be varied and controlled. Thus, as shown in Figure 10, the point of pivot has been moved away from the lever with the result that the duration of the discharge stroke more nearly approximates the duration of the suction stroke, and as shown in Figure 11, by moving the pivot point still further out the duration of the discharge stroke is practically the same as that of the suction stroke.

The spirit of the invention may be performed by means of various other mechanisms and in order to bring the use of such other mechanisms within the teachings of this invention, there is shown in Figures 5 to 8 inclusive, an entirely different arrangement for producing substantially the same result.

As shown in Figure 5 a lower sprocket 80 is driven from the source of power through the suitable reduction gears and in turn drives a chain 82 which runs over a plurality of additional sprockets 84, 86 and 88. The connecting rod 74 is secured at its lower extremity to the cross head 26 and its upper extremity is pivoted to the sprocket chain 82. Two of the sprocket's wheels, namely, 84 and 88, are mounted for movement whereas the remaining sprockets 80, and 86 are fixedly secured within the supporting casing, and, of the two that are mounted for movement, sprocket 88 is controlled by means of a manually operable pivoted lever 90 whereas the sprocket 84 tends normally to move in a direction away from the sprocket 88 owing to the provision of a tension spring 92.

During the operation of the device shown in Figure 5, as the upper extremity of the connecting rod 74 passes from a point immediately above the sprocket 86 downwardly past the sprocket 84 and thence to a point directly underneath the sprocket 80, it will be moving continuously downwardly and during such movement the suction stroke will take place. Similarly, as it continues to move upwardly past the sprocket 88 back to its starting point the discharge stroke is performed. Now by means of the provision of the spring 92 and the lever 90, the sprockets 84 and 88 may be moved to the right or to the left of the position shown in Figure 5 to vary the duration of both the suction and discharge stroke. Thus, if the sprocket 88 is moved inwardly to such an extent that the chain which runs over it will pass in a straight line from the upper sprocket to the lower sprocket, the spring 92 will draw the sprocket 84 outwardly to compensate for the inward movement of the former sprocket with the result that, as shown in Figure 6, on the suction stroke the upper portion of the connecting rod must move along the line A—D—C (Figure 6) whereas on the discharge stroke it only moves along the line C—A which is substantially less than the former line.

Now if the sprocket 88 is moved outwardly to the point B of Figure 7 the sprocket 84 moves inwardly a corresponding distance whereby the length of the line A—D—C more nearly approximates the length of the line C—B—A with the result that the discharge and suction strokes are more nearly equal. Continuing, the sprocket 88 may be moved outwardly to the position illustrated in B' in Figure 8 until the distance A—D—C is equal to the distance C—B'—A whereupon the suction and discharge strokes are equal to one another.

It is to be understood that as various changes are made in the duration of the suction and discharge strokes of the machine corresponding changes may be introduced into the dimensions of the bowl 48 or the other associated parts of the machine. These however, are matters entirely dependent upon the provision of the present invention and will be in most instances problems for the skilled mechanic rather than for the inventor, it being further pointed out that the invention may be incorporated in old machines now in use without changing any of the structure mentioned, and that such changes will be made only where it is desirable still further to increase the efficiency of the machine, or, in order still further to adapt the balance of the machine to the improved part thereof.

Although, the invention has been illustrated and described herein as embodied in a milking machine of a particular type, it is to be appreciated that the invention may be embodied in other similar organizations or may be employed in associated devices without departing from the scope of the present invention, and furthermore, that certain changes and modifications in design and construction may be made from time to time by those skilled in the art and such changes should in no instance be considered as constituting departures from the invention as herein set forth.

Having thus described my invention, what I claim as new and desire to secure by United States Letters Patent, is:

A milking machine comprising a pump having a reciprocating piston means for operating said piston with a suction stroke of relatively long duration and a discharge stroke of comparatively short duration with substantially no interval of time between the strokes of said piston, together with means for varying simultaneously the duration of such strokes while maintaining their linear lengths constant.

ALBERT BLATZ, Jr.